US006297821B1

(12) United States Patent
Baker et al.

(10) Patent No.: US 6,297,821 B1
(45) **Date of Patent: *Oct. 2, 2001**

(54) MAILING MACHINE INCLUDING AN EMBEDDED CONTROL SYSTEM HAVING A SCREEN CONTROL ARCHITECTURE

(75) Inventors: Walter J. Baker, Stratford; Lyndon A. Walker, Seymour, both of CT (US)

(73) Assignee: Pitney Bowes Inc., Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,373

(22) Filed: Apr. 23, 1998

(51) Int. Cl.[7] .................................................... G06F 13/00

(52) U.S. Cl. .......................... 345/335; 345/346; 705/401; 705/406; 705/411

(58) Field of Search .................................... 705/401–411; 345/335, 339, 340, 341, 342, 352, 353, 346, 357

(56) References Cited

U.S. PATENT DOCUMENTS

| | | | | |
|---|---|---|---|---|
| 5,437,010 | | 7/1995 | Blackman et al. | 395/161 |
| 5,611,059 | | 3/1997 | Benton et al. | 395/326 |
| 5,675,753 | | 10/1997 | Hansen et al. | 395/333 |
| 5,719,776 | * | 2/1998 | Haug | 705/411 |
| 5,726,883 | | 3/1998 | Levine et al. | 345/335 |
| 5,831,611 | | 11/1998 | Kennedy et al. | 345/335 |
| 6,032,122 | | 2/2000 | Gertner et al. | 345/326 |
| 6,097,386 | | 8/2000 | Bardon et al. | 345/333 |

* cited by examiner

*Primary Examiner*—Ba Huynh
(74) *Attorney, Agent, or Firm*—Angelo N. Chaclas; Michael E. Melton

(57) ABSTRACT

A control system for a mailing machine includes a user interface having a display, a memory having a screen region, a plurality of screens stored within the screen region and a control program for displaying the plurality of screens on the display and for controlling the operation of the mailing machine. Each of the plurality of screens has pre-function data and background function data, respectively. The pre-function data includes image data relating to a screen image for display. The control program uses the pre-function data to identify a pre-function to be executed before displaying the screen image and uses the background function data to identify a background function to be executed during the display of the screen image.

8 Claims, 8 Drawing Sheets

MAILING MACHINE INCLUDING AN EMBEDDED CONTROL SYSTEM HAVING A SCREEN CONTROL ARCHITECTURE

FIELD OF THE INVENTION

This invention relates to a mailing machine including an embedded control system. More particularly, this invention is directed to a mailing machine including an embedded control system utilizing a screen control architecture for controlling the operation of the mailing machine.

BACKGROUND OF THE INVENTION

Mailing machines, readily available from manufacturers such as Pitney Bowes Inc. of Stamford, CT, USA, are well known in the art and often include a variety of different modules, which automate the process of producing mailpieces. The typical mailing machine includes a variety of different modules or sub-systems where each module performs a different task on a mailpiece, such as: singulating (separating the mailpieces one at a time from a stack of mailpieces), weighing, sealing (wetting and closing the glued flap of an envelope), applying evidence of postage, accounting for postage used (performed by the postage meter), feeding roll tape or cut tape strips for printing and stacking finished mailpieces. However, the exact configuration of each mailing machine is particular to the needs of the user. Customarily, the mailing machine also includes a transport apparatus, which feeds the mailpieces in a path of travel through the successive modules of the mailing machine.

The mailing machine also includes a user interface for communicating messages to and receiving inputs from the operator as well as communicating with external devices, such as: an external scale, a data center or a personal computer. In many mailing machine applications, it is desirable to provide an ever increasing number of operator selectable functions through a user friendly interface. Some of the types of functions that an operator has control over are: setting the operating modes of the mailing machine for a batch run (postage only, weigh/no weigh, seal/no seal, print ad slogan/no ad slogan, seal only, etc.), printing reports, establishing accounts, downloading postage, changing the ad slogan, running diagnostics, and the like.

An effective user interface typically includes a display, a keyboard having a plurality of keys, an application software program and an operating system software program. Generally, the operating system software program controls the menus and messages shown on the display, interprets the inputs received from the operator via the keyboard and controls/coordinates the operations of the various modules of the mailing machine.

Every general purpose computer and computer-based system must have an operating system. Operating systems perform basic tasks, such as recognizing input from the keyboard, sending output to the display screen, keeping track of files and directories on the disk, and controlling peripheral devices such as disk drives and printers. For large integrated systems, such as a mailing machine, the operating system has even greater responsibilities and powers. It must coordinate the activities between the various modules and make sure that different programs (tasks) running at the same time do not interfere with each other.

Operating systems provide a software platform on top of which application programs run. Thus, the application programs are typically written with a particular operating system in mind. Together, the application programs and the operating system form a control system that governs the overall operation and functionality of the computer system.

In a mailing machine, this problem is exacerbated because of the communication and processing needs of the numerous modules and any other interfaced external devices (collectively "devices"). Traditional mailing machine control system architectures, such as that shown in FIG. 1, provide the ability to communicate with the various devices using separate interfaces. Separate interfaces enable simultaneous communication with all devices. These interfaces typically employ multiple universal asynchronous receiver/transmitter (UARTs) for handling serial data streams. The fact that each device has its own separate interface allows the control system to be designed in a very modular manner and operations to be concurrent. Software for each device includes an Interrupt Service Routine (ISR) and a Device Control task. The ISR performs the hardware interface to the UART and extracts the data from the Transmit buffer as well as storing any received data to the receive buffer. The ISR routine may perform low level message formatting operations, but this is purely an implementation point. The Device Control task is responsible for accepting and acting on requests from other tasks, in addition to managing any data received from its device. Typically a Device Control task has enough intelligence that allows it to communicate with its device with little, if any, intervention from an Application Control Task.

The Application Control task controls the synchronization of all Device Control tasks, and maintains the overall operating state of the control system. For example, the User Interface (UI) Task may accept a request by the operator to print a report. This request gets routed to the Application Task which in turn gets sent to the Printer Task. The Printer Task may get the necessary system data for the report, and will begin printing it. Next, the Operator may request information from a Peripheral Device. This request gets routed the Peripheral task via the Application task. The Peripheral task issues the appropriate commands to the external device, gets the responses and returns the data to the UI Task via the Application Task.

Although such prior art systems generally work well, they are time consuming and costly to develop while requiring large amounts of memory and computing resources. Also, incorporating fixes, enhancements or other upgrades to the control system are generally complex and time consuming as operating system changes must be integrated with application programs and vice versa.

Therefore, there is a need for a mailing machine including a control system that reduces development time and costs and system resource requirements while facilitating upgrades to the control system.

SUMMARY OF THE INVENTION

The present invention provides a control system having a plurality of screens where machine specific state control is spread across the plurality of screens by assigning background functions to each screen, respectively. While a particular screen is active on a display, the particular screens associated background function is executed by the control system.

In accordance with the present invention, there is provided a control system for a mailing machine, the control system comprising a user interface including a display, a memory having a screen region, a plurality of screens stored within the screen region and a control program for displaying the plurality of screens on the display and for controlling the operation of the mailing machine. Each of the plurality of screens having pre-function data and background function data, respectively. The pre-function data including image data relating to a screen image for display. The control program using the pre-function data to identify a pre-function to be executed before displaying the screen image and using the background function data to identify a background function to be executed during the display of the screen image.

Therefore, it is now apparent that the present invention substantially overcomes the disadvantages associated with the prior art. Additional advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
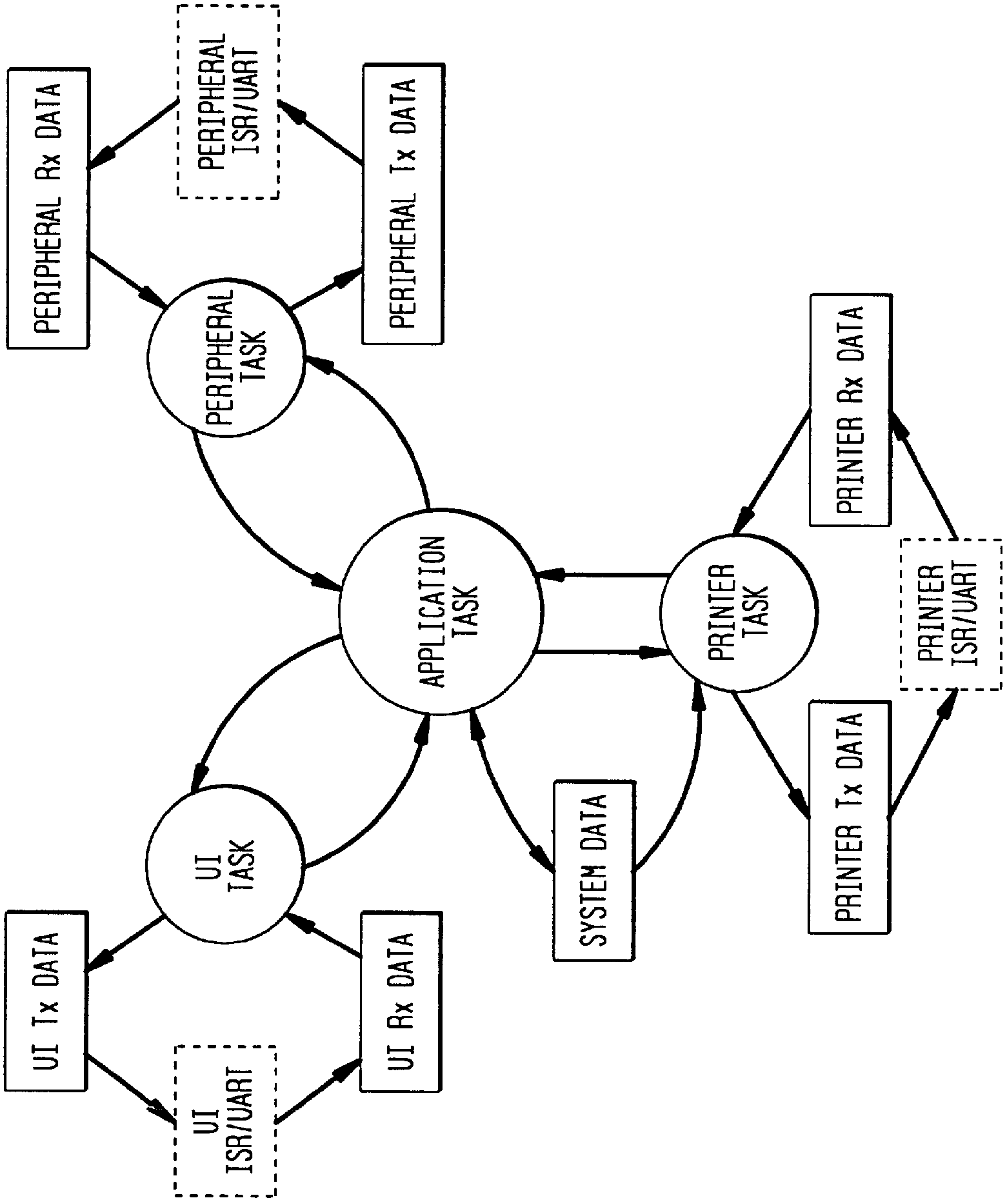
FIG. 1 (PRIOR ART)
FIG. 1 is a simplified schematic representation of a traditional mailing machine control system found in the prior art.
Figure 2:
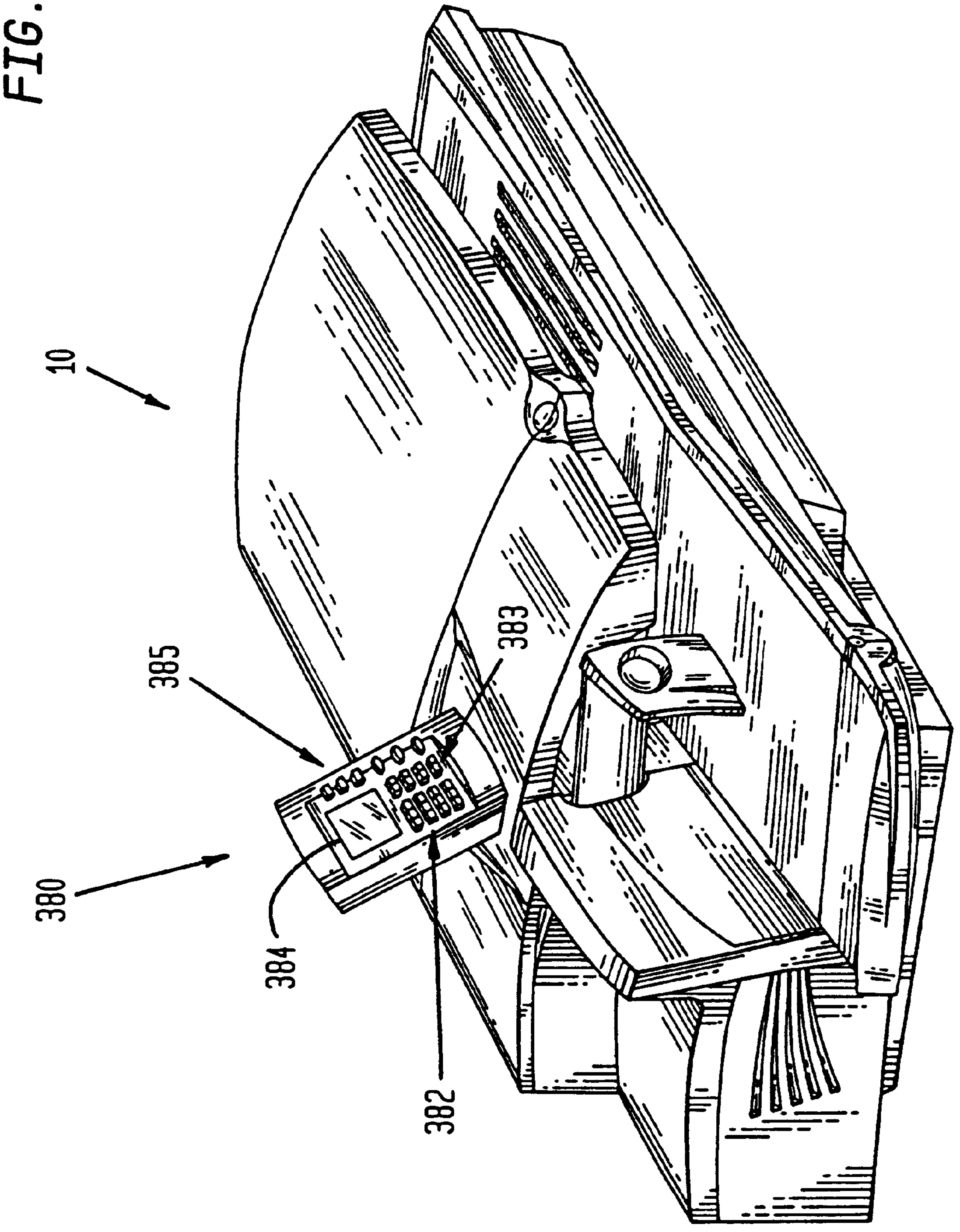
FIG. 2 is a simplified perspective view of a mailing machine in which the present invention may be incorporated.

Referring to FIG. 2, a simplified perspective view of a mailing machine 10 in which the present invention may be incorporated is shown. The mailing machine 10 includes a printer module (not shown), a conveyor apparatus (not shown), a micro control system (not shown) and a user interface 380. Still other modules of the mailing machine 10, such as those described above, have not been shown for the sake of clarity.

The user interface 380 includes a numeric keypad 382, a set of keys 383, a display 384 (CRT, LED, LCD, or otherwise) and a set of function keys 385. The keys 383 provide access to a set of "soft" commands or functions, such as: enter, clear, download postage, generate report, account setup, diagnostics and the like. By soft commands, it is meant that these commands are not directly related to processing a batch of mailpieces. In contrast, the function keys 385 provide access to a set of "hard" commands, such as: start, stop, print tape, reset batch counter, weigh mode on/off, sealer/moistener mode on/off and the like, which are directly related to processing a batch of mailpieces.

Figure 3:
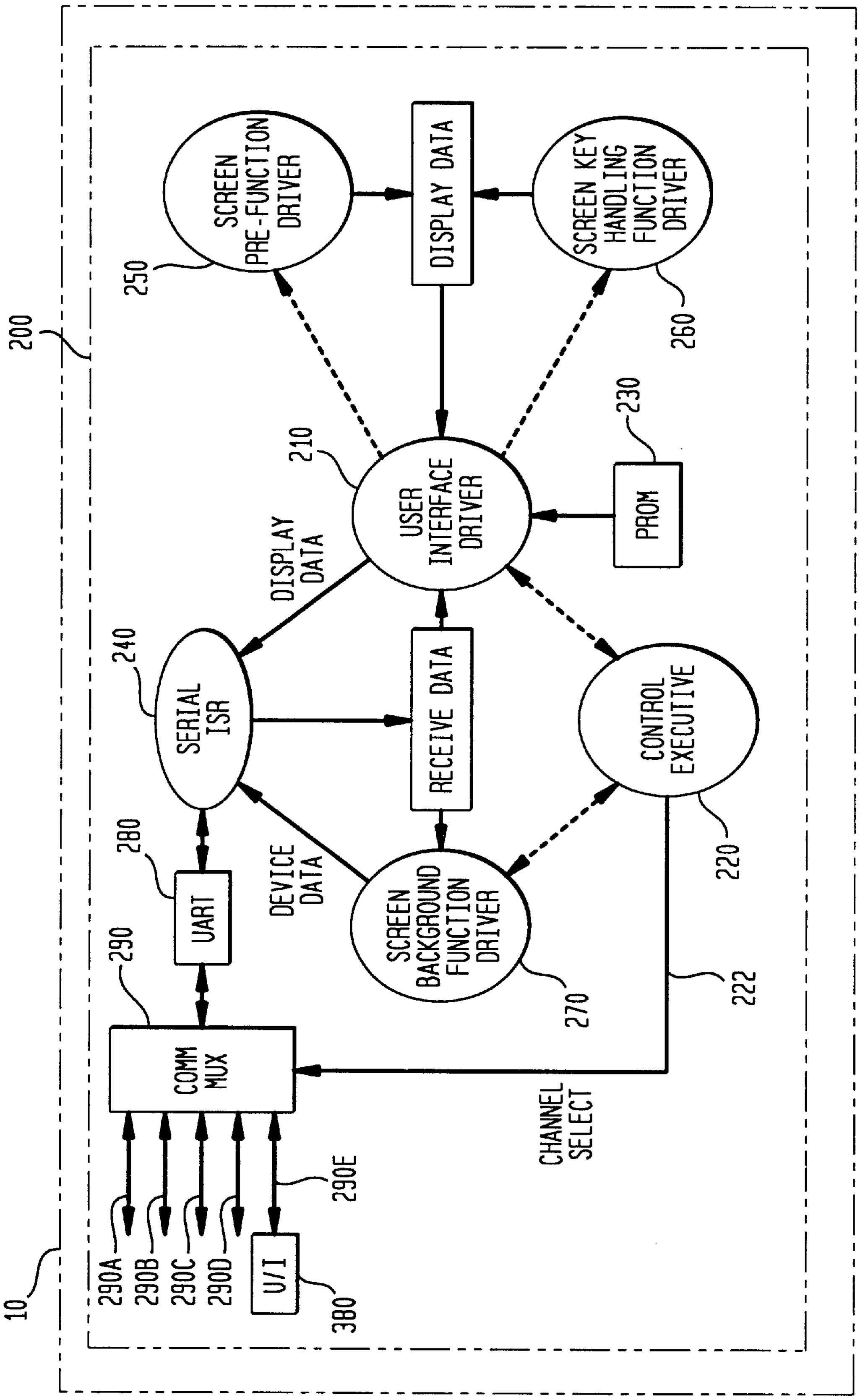
FIG. 3 is a simplified schematic representation of a mailing machine control system in accordance with the present invention.

Referring to FIG. 3, the mailing machine 10 further includes a control system 200 for governing the operation of the mailing machine 10. In the preferred embodiment, the control system 200 is a microprocessor based combination of hardware components, such as memory devices, and software programs. However, any suitable combination of processors, hardware and software may be employed. The control system 200 includes a user interface driver 210, a control executive 220, a programmable read only memory (PROM) 230, a serial Interrupt Service Routine (ISR) 240, a screen pre-function driver 250, a screen key handling function driver 260, a screen background function driver 270, a universal asynchronous receiver/transmitter (UART) 280 and a communication multiplexer 290 having a plurality of communication channels 290A, 290B, 290C, 290D and 290E. The user interface driver 210 receives input from and displays menus and messages to the user interface 380. The control executive 220 includes a channel select line 222 in operative communication with the communication multiplexer 290 for selectively placing one of the plurality of communication channels 290A, 290B, 290C, 290D and 290E in operative communication with the UART 280. The plurality of communication channels 290A, 290B, 290C, 290D and 290E are each in operative communication with a different device (meter, weighing module, printer controller, etc.). The operating mode of the mailing machine 10 determines which of the plurality of communication channels 290A, 290B, 290C, 290D and 290E, and in turn which device, is in communication with the user interface driver 210. In the preferred embodiment, the user interface 380 is operatively coupled with communication channel 290E. The PROM 230, commonly referred to as a language PROM, contains a series of text strings that are accessed by the user interface driver 210 for display. The ISR 240 provides the software interface to the UART 280. Generally, a solid connecting line between the components of the control system 200 indicate a data flow path while the dashed connecting lines indicate a control flow path.

Those skilled in the art will recognize from the brief description provided above and the detailed descriptions provided below that the user interface driver 210, the control executive 220, the screen pre-function driver 250, the screen key handling function driver 260 and the screen background function driver 270 form a control program for governing the overall operation and functionality of the mailing machine 10. In the preferred embodiment, the control program has been organized into these various modules.

The architecture of the control system 200 is built around a plurality of screens (not shown) that provide an operator with the ability to view the condition of the mailing machine 10, as well as the ability to set various system parameters to configure the mailing machine 10 for specific modes of operation. To accommodate this architecture, the screen pre-function driver 250, the screen key handling function driver 260 and the screen background function driver 270 cooperate to manage the processing activities associated with each of the plurality of screens, respectively. The screen pre-function driver 250 processes certain pre-functions before any data for a screen is displayed and allows all of the text and data elements that are associated with the screen to be initialized and formatted so they can be properly displayed. The screen background function driver 270 processes those functions that occur independently from any actions being performed by the operator on the mailing machine 10. In the preferred embodiment, interrupt handlers, such as those that update timers and handle data transmission and reception, are not considered to be screen background functions. Examples of activities that are considered to be screen background functions that are handled by the screen background function driver 270 include: polling the postage meter (not shown), conducting dynamic weighing activities (initialize, calibrate, take readings, etc.), reading/updating of data as it relates to the states of various sensors (not shown) sending new screen data to the display 384 as a result of text or field updates, communicating with the printer. The screen key handling function driver 260 handles key presses by the operator and is therefore invoked each time a key 382, 383 or 385 is pressed. However, the exact activity associated with each key depends on the type of key and its associated command or function as defined by the particular screen being displayed. For example, referring to FIGS. 2 and 3, although the operation of the numeric keypad 382 and the function keys 385 are fixed, not all of these may be enabled for any given screen. As another example, not only does the given screen control whether or not the soft keys 383 may or may not be enabled, but also the particular function (command) associated with each soft key 383.

Figure 4:
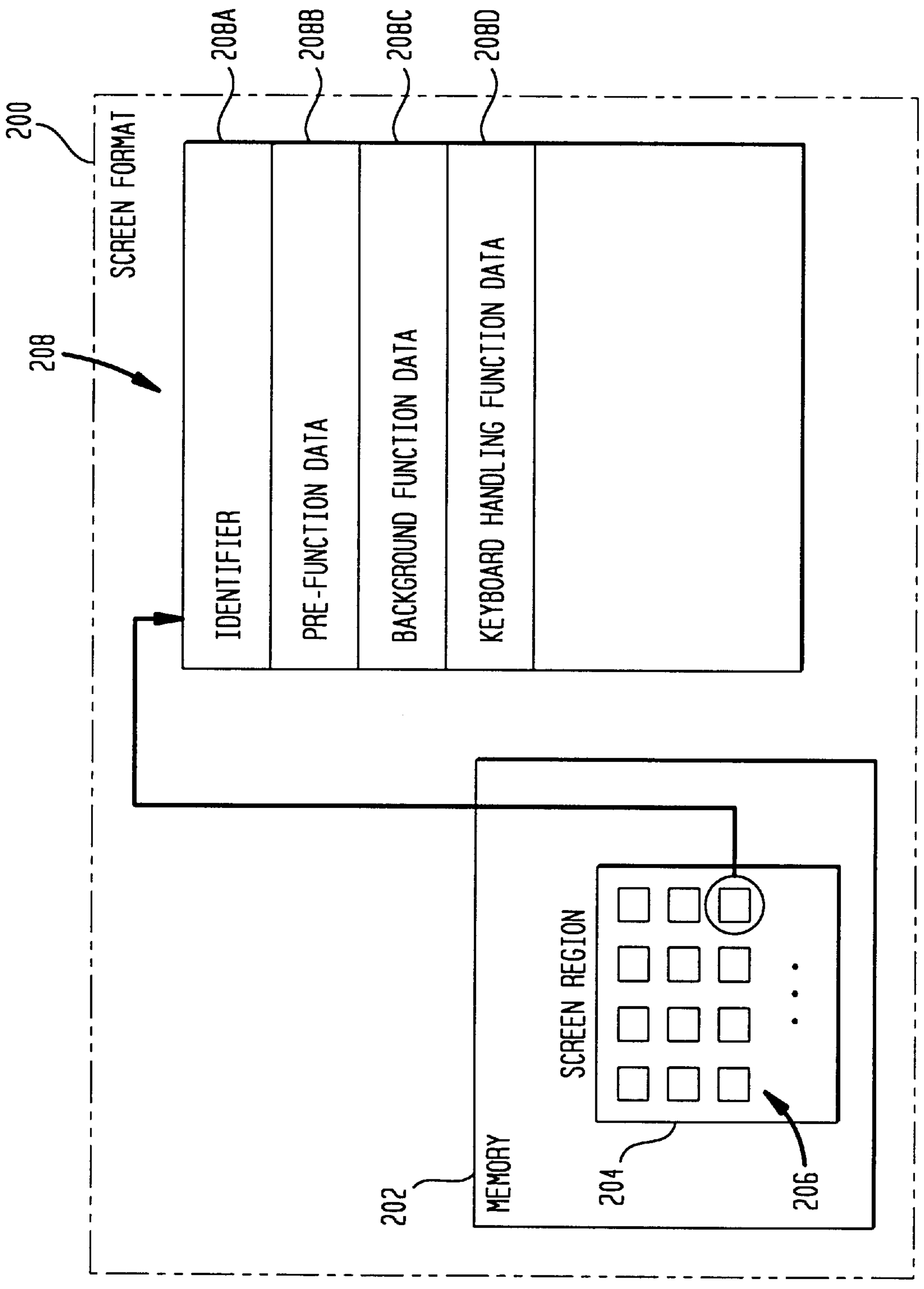
FIG. 4 is a simplified schematic representation of a memory located within the mailing machine control system having a screen memory region and a screen file format for each screen in accordance with the present invention.

Referring to FIG. 4, a memory 202 located within the mailing machine control system 200 having a screen memory region 204 is shown. The screen memory region 204 includes a plurality of screens 206 for display on the user interface 380 (not shown). The plurality of screens 206 are each organized according to a screen format 208 having a screen identifier 208*a*, pre-function data 208*b*, background function data 208*c* and keyboard handling function data 208*d*. The screen identifier 208*a* provides a unique reference, preferably a numeric or alpha-numeric string, for distinguishing between individual ones of the plurality of screens 206. The pre-function data 208*b* includes image data necessary to display a screen image on the display 384 and a listing or other indication of which pre-functions are executed for each of the plurality of screens 206, respectively. The background function data 208*c* includes a listing or other indication of which background functions are executed for each of the plurality of screens 206, respectively. Referring to FIGS. 2 and 4, the keyboard handling function data 208*d* includes an indicator to identify which of the function keys 385 are enabled, which of the soft keys 383 are enabled and assigning their respective commands, and whether or not the numeric keypad 382 is enabled. In this manner, each of the plurality of screens 206 is configured to respond to or ignore key presses by the operator according to the information contained within each respective keyboard handling function data 208*d*.

It is important to note that each of the plurality of screens 206 is not required to be configured with background functions. That is, background functions need not be performed for each screen. Thus, the background function data 208*c* may be an empty set for certain screens. In the preferred embodiment, each background function is executed on a periodic basis. The execution interval for each background function is determined by a timing parameter associated with each particular background function in the background function data 208*c*. As a result, each background function can execute at different intervals. Also, for different screens, the same background function may execute at different intervals. Generally, the execution intervals range from about 100 milliseconds to several seconds and is typically determined by how often control system information and other information needs updating. Thus, the background functions will not necessarily be executed each control cycle (discussed below).

Referring to FIG. 3 and 4, each background function also includes a device parameter, if necessary, indicating which device needs to be selected via the control executive 220 and the communication multiplexer 290. In this manner, the control system 200 may establish communication, as necessary, with any device attached to one of the plurality of communication channels 290A, 290B, 290C, 290D and 290E.

The control system 200 executes a control cycle in continuous fashion. The practical effect is that the control cycle executes hundreds of times per second. During each control cycle, the control system 200 processes both foreground functions and the background functions discussed above. Generally, the foreground functions include: handling of operator requests via key presses, switching screens, extracting postal rate data from a rate table, monitoring for screen saver mode and the sequencing of mail processing activities which are based upon the mode of the mailing machine (set postage amount, debit postage amount, issue print commands, wait for trip request, command scale to weigh mailpiece, updating piece count, etc.). In the preferred embodiment, foreground functions and background functions are equal in priority. This means that if a background function indicates it has not completed processing, the foreground functions will not occur. Likewise, foreground functions will not be suspended in order to run a background function. For example, the background functions will not execute until the display is finished updating.

When the foreground functions are completed for a given control cycle, and the background execution interval has elapsed, the background function is allowed to execute. The background function communicates with the foreground operations by a set of codes returned by the background function. These codes indicate whether or not the background function is busy, idle or needs a specific peripheral device selected through the communication multiplexer 290 as described above. A provision exists for the foreground operations to pass any data that is received from the active one of the plurality of communication channels 290A, 290B, 290C, 290D and 290E to the background function when the background function is called. The fact that data is available for a background function will override the interval timer and cause the background function to be invoked sooner.

Figure 5:
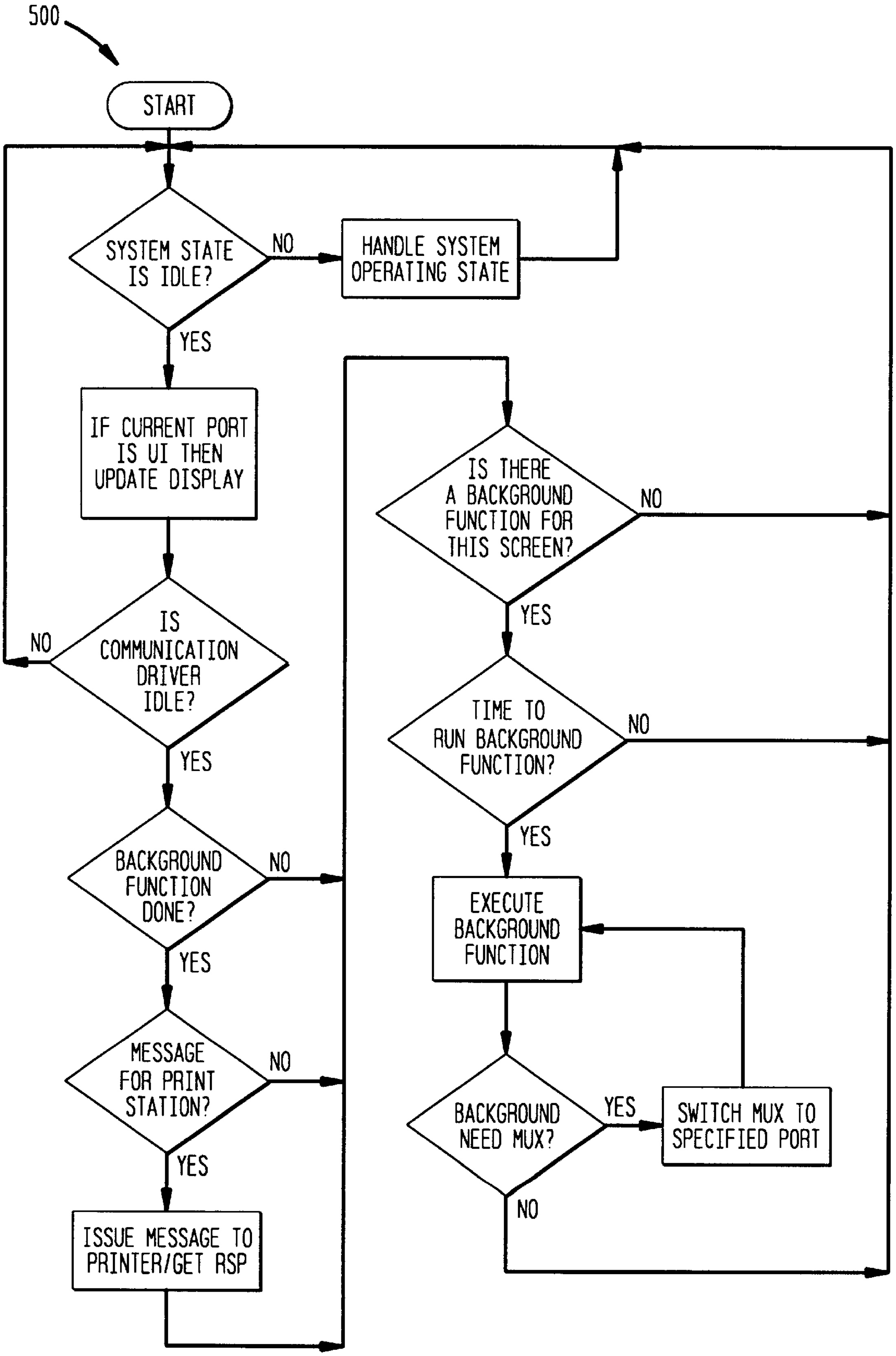
FIG. 5 is a simplified schematic representation of a main control loop in accordance with the present invention.

Referring to FIG. 5 in view of the structure of FIG. 3, the control cycle as defined by a main control loop (MCL) 500 executed by the control executive 220 is shown. The MCL 500 is responsible for sequencing all system functions in a deterministic manner. The discussion of the MCL 500 will be limited to an IDLE processing state, rather than describing other operating states that include Envelope Processing, Tape Processing or Calibration functions. However, those skilled in the art will recognize the logical extension of the MCL 500 concepts to these other states.

During the IDLE state, three activities are allowed: (i) updating the display 384 (not shown) if communication channel 290E is selected; (ii) checking for a message that needs to be sent to the printer (not shown); (iii) checking to see if it is time to execute a background function as defined by the execution parameter associated with the background function data associated with each particular screen 206; and (iv) checking to see if execution of the background function is completed.

If no other communication activities are in-progress (nothing being received, and nothing being transmitted) the MCL 500 will update the display 384, if necessary, by checking for a message that needs to be sent to the display 384 (not shown). If a message needs to be sent, the MCL 500 will send the specified message to the display 384 and await a response. If the current driver 210, 250, 260 and 270 is complete and the background function is completed, then the MCL 500 will check for a message that needs to be sent to the printer (not shown). If a message needs to be sent, the MCL 500 will send the specified message to the printer (not shown) and await a response. If there is no printer message waiting to be sent, the MCL 500 checks to see if there is a background function for the current screen. If a background function has been defined for the screen, and the time period to run that background function has elapsed, then the background function is executed. The MCL 500 checks the returned status from the background function. If the status indicates that the MCL 500 should switch the communication multiplexer 290 to a different one of the plurality of communication channels 290A, 290B, 290C, 290D and 290E, then the MCL 500 performs the switch, and the background function is called again. The background function can complete its processing after being called only once, or the MCL 500 may be required to call it multiple times. The background function indicates its completion status to the MCL 500 by returning one of the following values: PENDING_COMPLETION or FINISHED.

Figure 6A:
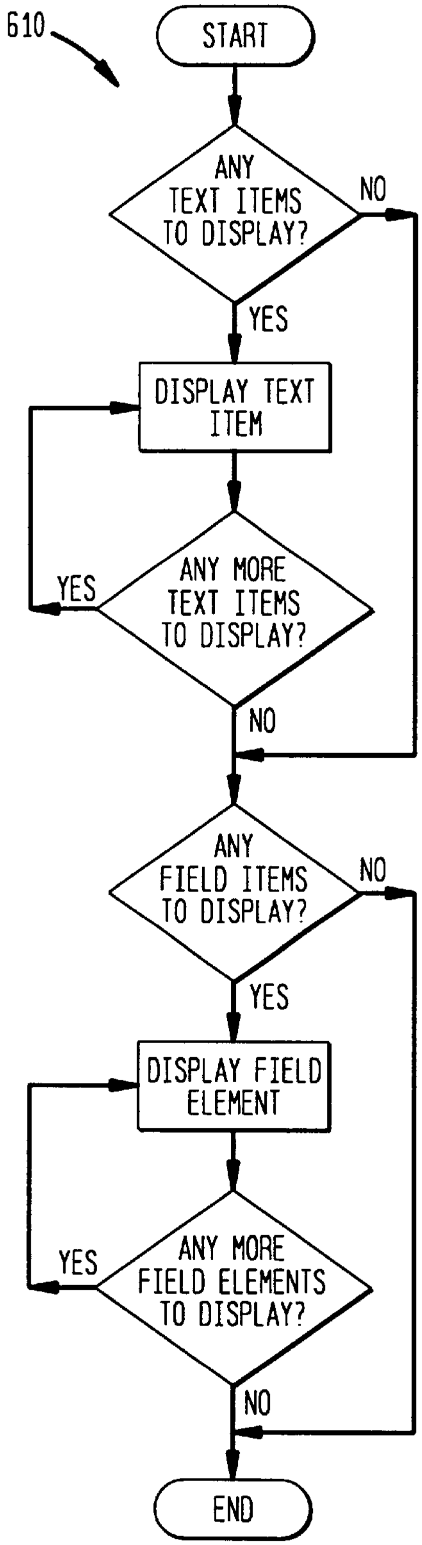
FIGS. 6A, 6B and 6C are a simplified schematic representation of the procedures executed to display a screen in accordance with the present invention.
Figure 6B:
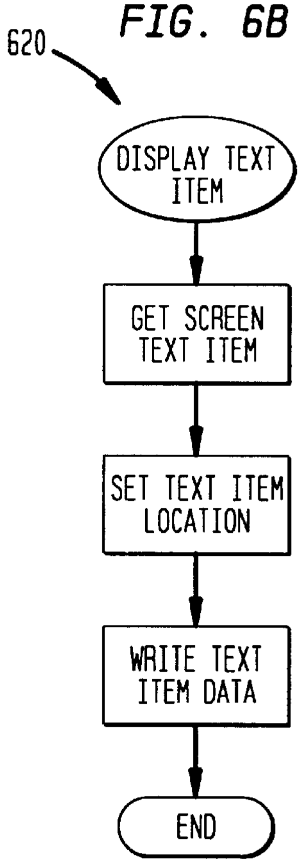
Figure 6C:
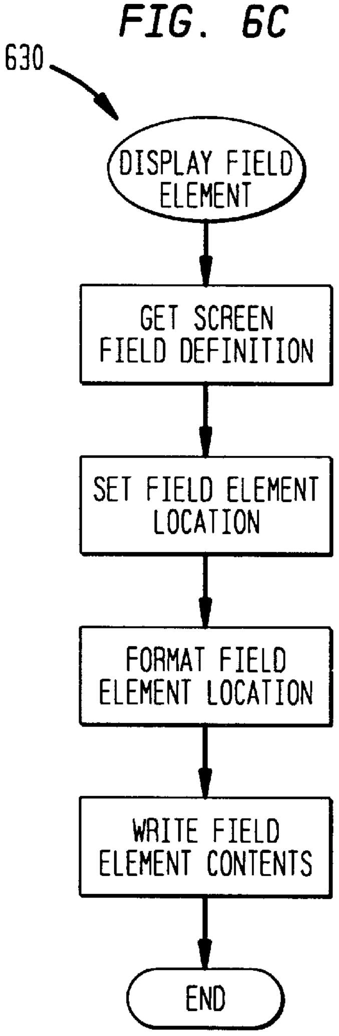

Referring to FIGS. 6A, 6B and 6C in view of the structure of FIGS. 3 and 4, the procedures 610, 620 and 630 for displaying a particular one of the plurality of screens 206 are shown. The procedure 610 shows the main screen display routine while the procedure 620 shows a text display subroutine and the procedure 630 shows a field display subroutine. When a screen (not shown) is being activated, due to a key press by the operator, system start-up or other event, the particular screen's pre-function data 208*b* (not shown) gets called by the screen pre-function driver 250. The purpose of the pre-function driver 250 is to extract all required text data, as indicated by particular screen's pre-function data 208*b*, from the Language PROM 230, format the text data and store it to a display data buffer. The contents of the display buffer gets picked up by the user interface driver 210 which will in turn send it to the display 384.

Each of the plurality of screens 206 consist of text items and field items. Text items are screen elements whose contents will not change. A field item on the other hand, typically references a system variable which is required to be formatted in a certain manner before it gets displayed. A screen 206 is not required to have a minimum number of text items or field items.

Figure 7:
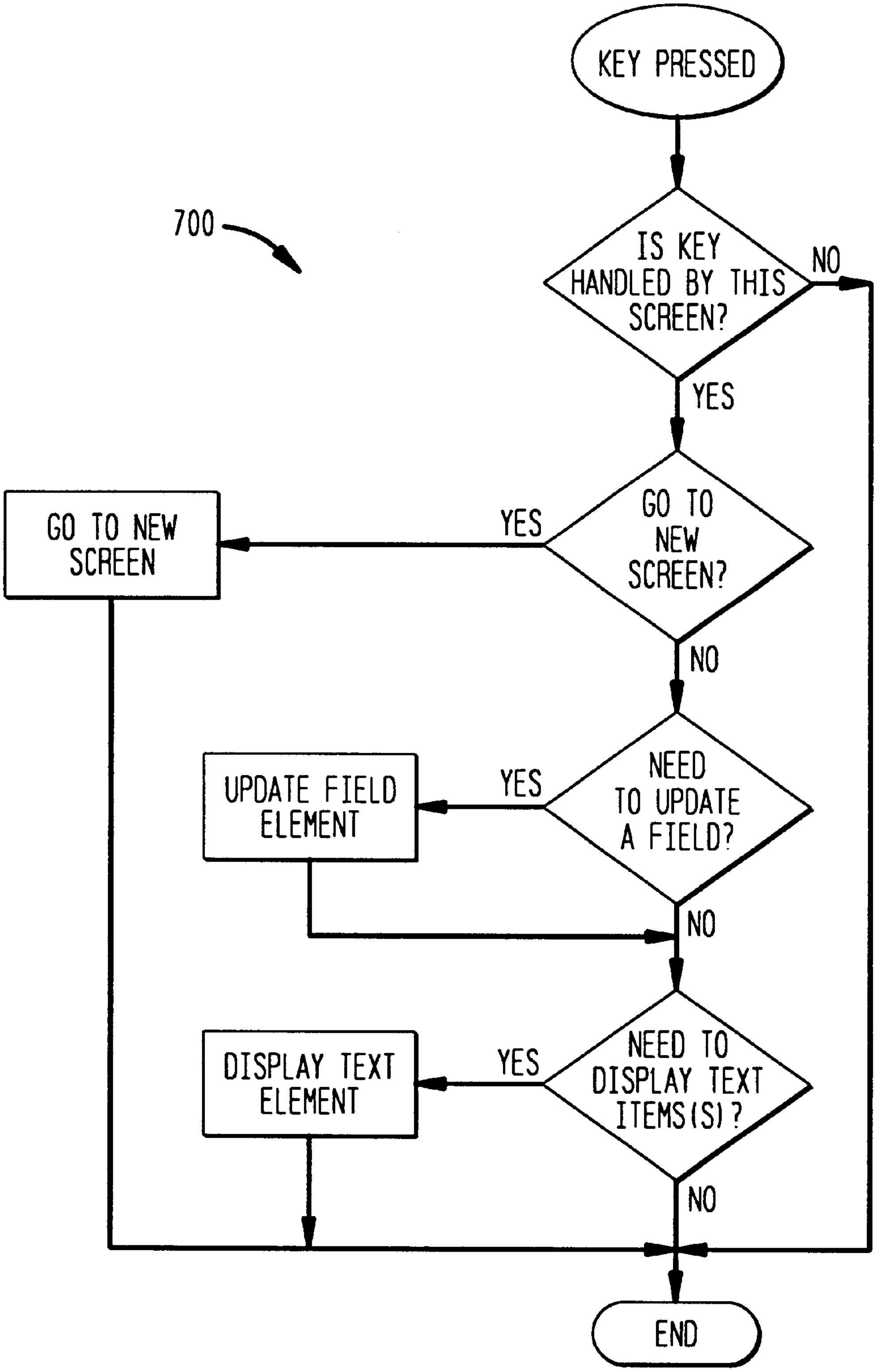
FIG. 7 is a simplified schematic representation of key press processing in accordance with the present invention.

Referring to FIG. 7 in view of the structure of FIGS. 3 and 4, the procedure 700, executed by the screen key handling function driver 260 (not shown), for handling key presses by the operator is shown. Every time a key 382, 383 or 385 is pressed, the associated command is called if one has been specified, as described above, in the screen keyboard handling function data 208*d* (not shown). Each screen 206 (not shown) is designed to respond to predetermined keys and key sequences. Usually higher level screens respond to more key presses than lower level screens. A higher level screen is considered to be one of the idle screens that gets displayed when no mail processing activities are being performed. These screens allow the user to specify a postage value, and therefore the screen's key handling function must respond to the 0–9 keys, Clear key and the Decimal Point key. This key function must handle the Start and Tape keys, and the other special purpose keys (including but not limited to: Funds, Print Input Options, etc.). Lower level screens generally employ fewer keys 382, 383 or 385. For example, the Viewing the System Configuration screen only responds to the Scroll Keys and the Clear Key. As another example, the Viewing the Supply Status screen only responds to the Clear Key.

Figure 8:
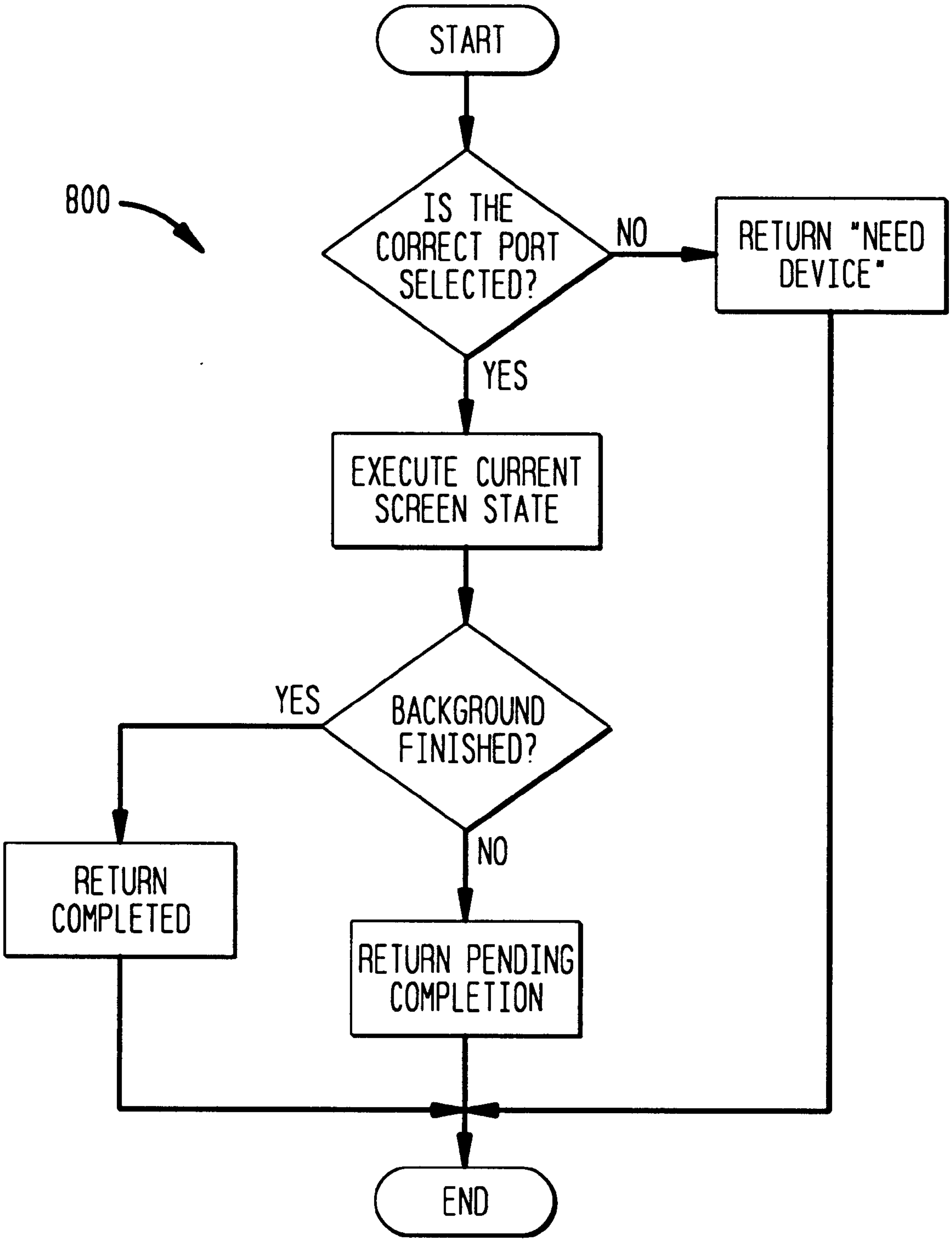
FIG. 8 is a simplified schematic representation of background function processing in accordance with the present invention.

Referring to FIG. 8 in view of FIG. 5 and the structure of FIGS. 3 and 4, the procedure 800, executed by the screen background function driver 270 (not shown), for processing background functions is shown. When the MCL 500 determines that a particular screen's background function can execute, as defined in the screen background function data 208*c* (not shown), the MCL 500 invokes it. When run, the background function will determine if the proper one of the plurality of communication channels 290A, 290B, 290C, 290D and 290E is selected. Typically, background functions are written to communicate with one device, and this device must be selected before the background function can continue. If the desired one of the plurality of communication channels 290A, 290B, 290C, 290D and 290E is not currently active, the background function will indicate which one of the plurality of communication channels 290A, 290B, 290C, 290D and 290E to select by returned status. Once the proper one of the plurality of communication channels 290A, 290B, 290C, 290D and 290E is selected, the background function can continue. Depending upon the background function's complexity, its execution may consist of multiple states. Typically, one state is performed with each execution of the background function. If a background function determines that its processing has not been completed, it will return PENDING COMPLETION status to the MCL 500. If processing is completed, it will return COMPLETED to the MCL 500. The MCL 500 will not allow any other devices to get control of the communications multiplexer 290 until the background function returns COMPLETED.

Those skilled in the art will now recognize that the present invention substantially solves those drawbacks associated with the prior art. The technique of associating background functions with each individual screen drastically simplifies the complexity of the MCL 500 by spreading machine specific state control across the various screens and their associated background functions. In this manner, as new functionality is required, the control program, including the MCL 500 and the procedures 610, 620, 630, 700 and 800, will remain constant while a new, modified or updated screen 206 along with its associated pre-function data 208*b*, background function data 208*c* and keyboard handling function data 208*d* is added to the control system 200. Similar benefits are derived from having the pre-function data 208*b* and the keyboard handling function data 208*d* associated with the plurality of screens 206, respectively.

Those skilled in the art will now recognize that the control system architecture of the present invention also lends itself to smaller slower processors where an Operating System may not be available or the user of one will drastically reduce overall performance by consuming system resources and available processing time.

Many features of the preferred embodiment represent design choices selected to best exploit the inventive concept as implemented in a high volume fully featured mailing machine. However, those skilled in the art will recognize that various modifications can be made to adapt the concepts of the present invention to other applications without departing from the spirit of the present invention.

Therefore, the inventive concept in its broader aspects is not limited to the specific details of the preferred embodiments but is defined by the appended claims and their equivalents.

What is claimed is:

1. A control system for a mailing machine, the control system comprising:

a user interface including a display;

a memory having a screen region;

a plurality of individual screen format files stored within the screen region, each of the plurality of individual screen format files having a unique identifier, respective pre-function data and respective background function data, where the respective pre-function data includes respective image data relating to a respective screen image for display and the respective pre-function data along with the respective background function data define a state control for the mailing machine that is distributed among the plurality of individual screen format files; and a control program for displaying the respective screen images on the display and for controlling the operation of the mailing machine for each of the plurality of individual screen format files by:

using the respective pre-function data to identify a previously defined respective pre-function which is executed before displaying the respective screen image; and using the respective background function data to identify a previously defined respective background function which is executed during the display of the respective screen image.

2. The control system of claim 1, wherein:

the respective background function data includes a respective execution parameter indicative of an execution interval for the respective background function whereby the control program executes the respective background function after the execution interval lapses.

3. The control system of claim 2, wherein:

the user interface includes a plurality of keys;

each of the plurality of individual screen format files has respective key handling function data; and for each of the plurality of individual screen format files, the control program is further for using the respective key handling function data to identify which ones of the plurality of keys are enabled and for assigning functions, respectively, to the ones of the plurality of keys that are enabled.

4. The control system of claim 3, wherein:

the control program includes a control executive and a plurality of distinct drivers for reading, interpreting and acting upon the respective pre-function data, the respective background function data and the respective key handling function data, respectively; and the control executive executes a control loop that sequences the plurality of distinct drivers in a deterministic manner for controlling the mailing machine.

5. A method for controlling a mailing machine, the method comprising the step(s) of:

providing a user interface including a display;

providing a memory having a screen region;

storing a plurality of individual screen format files within the screen region, each of the plurality of individual screen format files having a unique identifier, respective pre-function data and respective background function data, where the respective pre-function data includes image data relating to a screen image for display and the respective pre-function data along with the respective background function data defines a state control for the mailing machine that is distributed among the plurality of individual screen format files;

displaying the respective screen image on the display for each of the plurality of individual screen format files; and controlling the operation of the mailing machine for each of the plurality of individual screen format files by using the respective pre-function data to identify a previously defined respective pre-function which is executed before displaying the respective screen image and using the respective background function data to identify a previously defined respective background function which is executed during the display of the respective screen image.

6. The method of claim 5, further comprising the step(s) of:

including a respective execution parameter within the respective background function data indicative of an execution interval for the respective background function whereby the control program executes the respective background function after the execution interval lapses.

7. The method of claim 6, further comprising the step(s) of:

providing the user interface with a plurality of keys;

including within each of the plurality of individual screen format files respective key handling function data; and for each of the plurality of screens, using the key handling function data to identify which ones of the plurality of keys are enabled and assigning functions, respectively, to the ones of the plurality of keys that are enabled.

8. The method of claim 7, further comprising the step(s) of:

providing a plurality of distinct drivers for reading, interpreting and acting upon the pre-function data, the background function data and the key handling function data, respectively; and executing a control loop that sequences the plurality of distinct drivers in a deterministic manner for controlling the operation of the mailing machine.

* * * * *